Sept. 14, 1965   F. C. SENIOR ETAL   3,206,299
DENSE-BED, ROTARY, KILN PROCESS AND APPARATUS
FOR PRETREATMENT OF A METALLURGICAL CHARGE
Filed Oct. 18, 1961   3 Sheets-Sheet 2

INVENTORS
Franklin C. Senior
Chester E. Shaffer
BY
Charles J. Elderkin
ATTORNEY

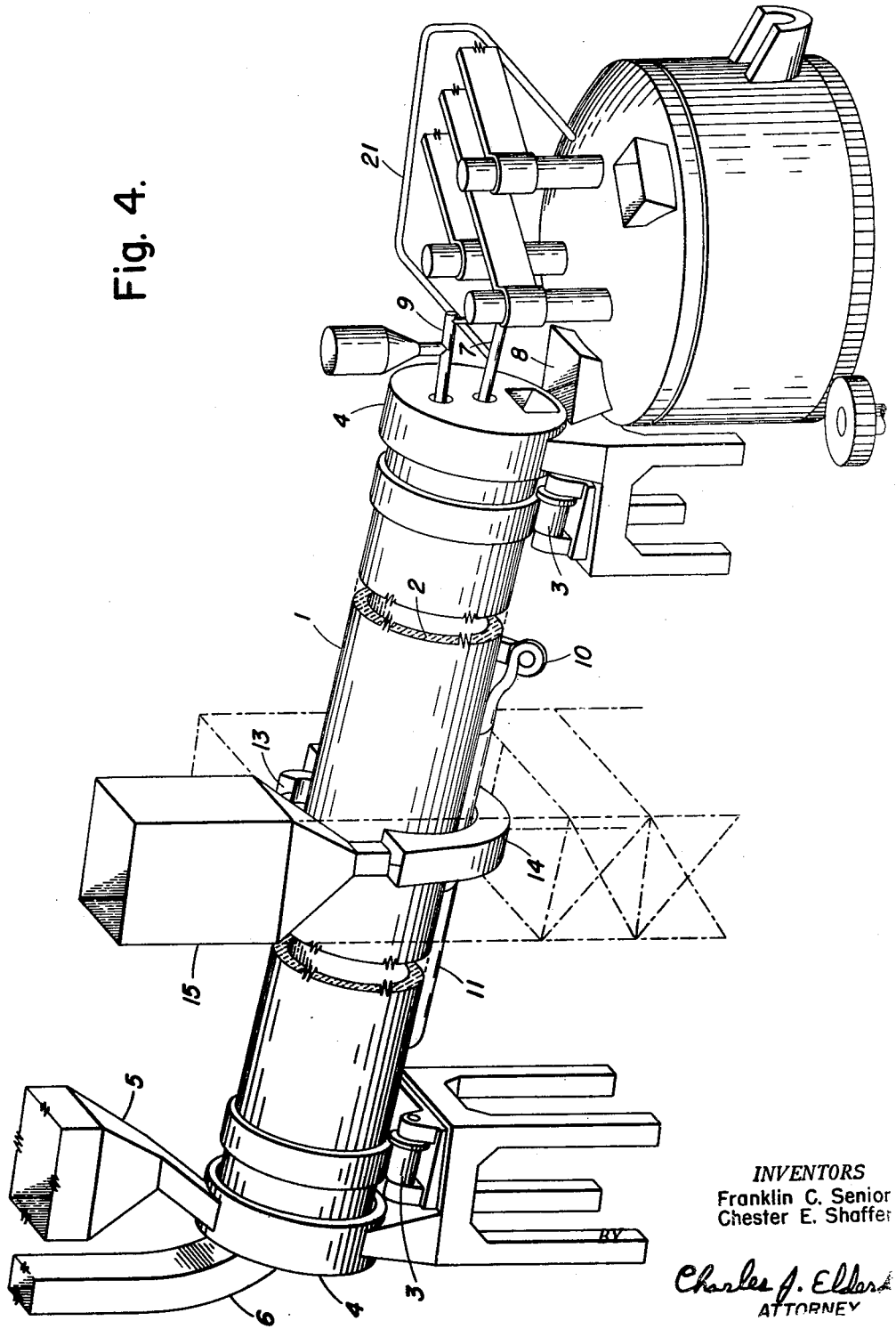

United States Patent Office 3,206,299
Patented Sept. 14, 1965

3,206,299
DENSE-BED, ROTARY, KILN PROCESS AND APPARATUS FOR PRETREATMENT OF A METALLURGICAL CHARGE
Franklin C. Senior, Youngstown, N.Y., and Chester E. Shaffer, Niagara Falls, Canada, assignors, by mesne assignments, to Independence Foundation, Philadelphia, Pa., a corporation of Delaware, and Koppers Company, Inc., Pittsburgh, Pa., a corporation of Delaware
Filed Oct. 18, 1961, Ser. No. 145,865
12 Claims. (Cl. 75—11)

This application is a continuation-in-part of application Serial No. 36,026 filed June 14, 1960, now abandoned.

This invention relates in general to metallurgy and more particularly to the preparation of metallurgical reduction burdens of a type ideally suited as feed to electric smelting furnaces. In particular, the invention has for a principal object the preparation of hot, pre-reduced, stabilized and free-flowing furnace reduction charges from a wide variety of raw materials through the application of a unique differential thermal treatment and gaseous reduction mechanism within a rotating kiln. The invention further contemplates the provision of improved kiln structures and operating techniques.

It is axiomatic that any metallurgical reactor will perform more efficiently if run on a raw material that does not vary appreciably in chemical and physical properties over a sustained period of time. Similarly, in any such reactor, a higher grade raw material will always produce more than one of low-grade. These principles have been dramatically demonstrated in the past few years by the application of numerous concentration, beneficiation, and sintering techniques to low-grade ores, such as taconites and the like, resulting in prepared or synthetic reduction burdens that have in many cases nearly doubled the output of conventional blast furnaces.

The gas- or oil-fired rotary kiln has long held a recognized position in this field, but due to the inherent operating nature of this type of unit, the number of desirable functions it can perform in any given process is necessarily limited. The functions for which a rotary kiln are most commonly employed include dehydration and calcining operations, the roasting of sulfur and arsenic under oxidizing conditions, and the pre-reduction of metallic values under reducing conditions. It is common practice at many installations to combine the first of these objectives with either of the other two, but the latter two functions are, of course, mutually exclusive of each other. This inherent restriction to either oxidizing or reducing conditions imposes a severe limitation on the utility of rotary kilns, as many raw materials containing sulfur, arsenic, etc. would constitute a much better furnace feed if sulfur and the like could be eliminated and the metallic values could be pre-reduced to a substantial degree in a unit operation.

Most beneficiation operations now in use are primarily concerned with up-grading of the ore itself, and the preparation of the actual furnace burden, comprising reductants and fluxes, as well as ore, is done either in the furnace or just prior to charging into the furnace. A notable exception to this practice is the so-called "self-fluxing" sinter in which lime or other suitable flux is mixed with the ore before the sintering step. Preparation of other constituents of the furnace burden—coking of coals, burning lime and the like—are carried out separately in coke plants, lime kilns or other equipment, all of which add to the cost of the product, both in terms of capital expense and actual production costs. This, of course, is in addition to the cost of sintering machines, kilns and other beneficiation equipment used in preparing the ore itself.

A further problem in the operation of conventional kilns is that the exit gas velocity is generally sufficient to carry fine particles of ore and reductant out of the kiln. This results in substantial dust losses, particularly where fine ores are being treated. Recovering and recharging of these fines is found to be unsatisfactory, as they merely become a circulating load which quickly builds up to unmanageable size.

In normal operation of rotary kilns, heating is supplied by burning pulverized coal, oil or gas at the discharge end through a firing hood. Air for combustion is drawn into the firing hood and kiln by natural draft from a stack or chimney, or by an induced-draft fan. Additional air is generally pre-mixed with the fuel by means of a pressure blower.

For efficient operation, sufficient air must enter the kiln at the firing hood to completely burn the fuel. The firing end of the kiln is, therefore, heated to a much higher degree than the remainder of the kiln, since most of the combustion is completed in the first one-quarter or one-fifth of the kiln. To reduce the temperature in this portion of the kiln, excess air may be inspirated into the firing end, which results in an oxidizing atmosphere being maintained throughout the length of the kiln. As mentioned heretofore, when reduction or partial reduction of ores is to be obtained in the kiln, an oxidizing atmosphere is not desirable.

The fusion point of the many types of mixtures of ores, fluxes, fuels, etc. commonly used in kilns varies between a low of about 1750° F. and a high of about 2300° F. This is the incipient fusion temperature in the kiln where ringing or coating of fused ore and flux is noticed on the kiln walls. For trouble-free operation it is necessary to operate at somewhat below this critical temperature at the firing end.

Heretofore, kiln prereduction has been carried out primarily with carbon. A common expedient, for example, has been to press finely-divided coal or coke and ore into briquettes, thus insuring intimate solid-solid contact. When operating at a firing-end temperature of between 1750° and 2300° F., the longitudinal mid-point temperature of the kiln is normally 800° to 1200° F. At these temperatures the reduction of oxides of iron with carbon is very slow. Thus, with a total retention time of 3 hours in an 80-ft. kiln, the effective time for ore reduction is 1½ hours or less. As the temperature increases the rate of reduction increases, until at 1800° F. it is quite rapid. Even at this temperature, however, time is required for CO to diffuse into the ore particles to form $CO_2$, and the $CO_2$ to diffuse out, to complete the reduction according to the following equations for iron ore:

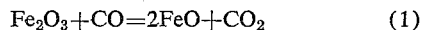
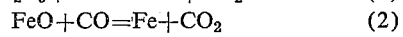

$$Fe_2O_3 + CO = 2FeO + CO_2 \quad (1)$$
$$FeO + CO = Fe + CO_2 \quad (2)$$

In order to obtain higher temperatures at the longitudinal midpoint of the kiln, air can be admitted through a damper near the top of the firing hood. However, this air stratifies in the kiln and flows along the roof line for one-quarter to one-third of the kiln length. Here it apparently diffuses throughout the cross-sectional area and reacts with some of the carbon and residual volatile gases from the coal in the ore bed, and creates and excessively hot zone of combustion. As a result, doughnut-shaped rings tend to form consisting of ore, flux, and coal ash. These rings may be from 20% to 50% of the kiln length from the discharge end and can be serious enough to cause complete shut-down of the kiln.

For solid state-gaseous reduction of ore in the rotary kiln, carbon must be present to give the following additional reactions:

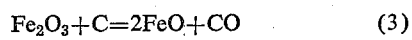

$$Fe_2O_3 + C = 2FeO + CO \quad (3)$$

$$FeO+C=Fe+CO \quad (4)$$

Previous practitioners generally have mixed carbon in the form of coal or coke with the ore and fluxes and charged the mixture at the feed end. With coke, which contains only 1 to 2% volatile matter, this is a satisfactory method of supplying the carbon. Low-volatile coal of the Pocohontas type, containing 16 to 19% volatile matter, may also be fed at the feed end, although with less satisfactory results. As the coal travels through the kiln and reaches the hotter portions, it is de-volatilized, and since there is little oxygen in the reducing atmosphere of the kiln, much of the volatile matter leaves the kiln as unburned CO, $H_2$ and $CH_4$. However, only a small amount of heat is lost in distilled tars, since the volatile matter from this coal contains only 2 to 3 gallons per ton of coal. The use of high-volatile coals, generally classified as containing about 32 to 40% volatile matter, is not considered practical in the feed end of a kiln, due to double the amount of volatile gases and to the large amount of tar produced (10 to 12 gallons per ton of coal). The unburned volatiles and tars not only represent a large additional heat loss, but also wet the flue dust leaving the kiln, and cause plugging and sticking difficulties in the dust collector and auxiliary equipment.

Lignites may contain 40 to 50% volatile matter and will produce up to 20 gallons of tar or more on distillation in the absence of oxygen. Heat losses and tar troubles, when endeavoring to use lignites in the feed end, are even greater in a kiln with a neutral or reducing atmosphere than when using high volatile coals. Lignites, however, do not fuse or melt, and no sticking or ringing troubles are likely to be encountered, as with high volatile coking coals.

The foregoing seemingly insurmountable problems associated with the use of high-volatile coal in a rotating kiln have deterred prior-art investigators from its use therein, and when it was desired to use the highly-reducing hydrogen and methane gases contained therein they turned either to separate gas generators which produced mixtures of these gases or, in some cases, they designed processes requiring hydrogen of substantial purity, but left it for others to devise a means for producing this gas on an economic basis. Where volatile hydrocarbons have been used in rotating kilns, their application has been previously limited to the supplying of thermal units necessary to sustain the carbon and carbon monoxide reductions. Of course, this utilization was always limited by the above-described problems.

Some iron ores and coals contain sulfur in the form of pyrite ($FeS_2$). In a reducing atmosphere the sulfur cannot be burned out efficiently, but in an oxidizing atmosphere the sulfur may be burned in accordance with the following reactions:

$$FeS_2+3O_2=FeO+2SO_2 \quad (5)$$

$$2FeO+\tfrac{1}{2}O_2=Fe_2O_3 \quad (6)$$

Here, the sulfur is eliminated from the ore and is discharged from the kiln as $SO_2$ gas. As noted heretofore, it would be highly desirable from an economic point of view to burn out the sulfur in the reducing kiln.

In the development of the now quite diverse Strategic-Udy smelting processes, both the desirable characteristics as well as the problems of rotary kiln operation have been elucidated to a far reaching extent, in that, a rotary kiln has been used, at various times, with all of the above-described burdens, and for both oxidizing and reducing purposes. In essence, based on our studies and observations of kiln operating limitations, the present invention involves the provision of an integrated process in which all of the above-described functions, including the utilization of the full reducing capabilities of high-volatile coals, can be performed simultaneously in one kiln, with the added benefit that the resulting kiln discharge constitutes a complete furnace burden containing all of the elements, including carbonaceous reductant, necessary for an efficient reduction smelting operation. It is thus made possible, in one continuous operation, to calcine the kiln charge by removal of $CO_2$ and other volatiles therefrom, dehydrate the charge, oxidize and drive off sulfur and arsenic, remove oxygen from the ore effecting partial reduction, sinter fines into larger clusters to cut down on dust losses, utilize the volatiles of the reductant effectively by cracking the hydrocarbons and coking the reductant, adjust the final residual carbon content of the kiln discharge to any desired level, and generally deliver at the discharge end of the kiln a complete furnace reduction burden of closely controlled constant composition. Thus, when compared to conventional iron-making facilities, this single unit functions as a dryer, a sinter plant, a coke oven, and the upper portion of a blast furnace.

The reducing capabilities of a kiln operated in accordance with the principles of our invention comprise a very substantial improvement over processes found in the prior art, and are based on the recognition and control of two factors which have either been ignored or erroneously treated by prior investigators. The first of these is the relation between kiln atmosphere and bed atmosphere. While the character of the atmosphere in the kiln is readily determinable as to oxidizing or reducing capabilities, the atmosphere within the bed is much more complex, being intimately tied to the totality of all the chemical reactions taking place therein. By adopting the "systems approach," that is, by first analyzing all of the possible reactions that might take place in the bed and postulating an ideal model, one can then compare this with what is actually observed in practice and determine the physical steps necessary to bring about the ideal conditions. In this manner, our studies led us to the second crucial factor, which we call the load factor. This term is used herein to mean the percentage of the total cross-sectional area of the kiln which is occupied by the material being treated. Our invention is based, in part, on the discovery that through close control of the load factor and retention time, coupled with temperature control throughout the length of the kiln, we can effectively generate hydrogen, methane and other hydrocarbons from high-volatile materials and utilize these gases in the pre-reduction of the ore. Of course, this is in addition to the more conventional reaction mechanisms of reduction through solid-solid contact of carbon with ore and gaseous reduction with carbon monoxide.

It is obvious that the exact chemical reactions which an ore undergoes during prereduction in a rotary kiln will vary with the chemical and mineralogical makeup of the individual ore. Accordingly, the ideal system model and hence the load factor, temperature, and retention time will also vary from ore to ore. However, we have found no cases where the load factor should be greater than 15%, and in the majority of the ores treated a factor between 6% and 11% has been found satisfactory. It is of interest to note that prior investigators, when they have specified a load factor at all, have generally set a figure between 25% and 33%. We have found that at such loadings the atmosphere of the kiln has virtually no effect on reactions within the bed and that very little reduction can take place. This is because such a deep bed cannot be controlled with respect to temperature and reducing character by the kiln atmosphere. Our invention, on the other hand, allows careful control of bed conditions by control of both the temperature and reducing capabilities of the atmosphere above the bed, with the consequence that none of the aforementioned difficulties are encountered. This mechanism of control is set out in more detail below.

For complete reduction of hematite, the reactions are:

$$Fe_2O_3+3CO \rightarrow 2Fe+3CO_2$$
$$Fe_2O_3+3H_2 \rightarrow 2Fe+3H_2O$$
$$Fe_2O_3+CH_4 \rightarrow 2Fe+CO+2H_2O$$

Intermediate reduction reactions such as hematite to magnetite, magnetite to wustite, and wustite to iron, also occur, either with hydrogen, methane, and/or carbon monoxide.

It is well known that when, in the absence of oxygen, coals are heated, hydrogen, methane, carbon monoxide and other gases to a smaller extent are evolved. For example, when coals are carbonized, the distillation gas may contain 20 to 60% hydrogen, 25 to 50% methane and 3 to 7% carbon monoxide. The composition depends on the type of coal used, the temperature of carbonization, the type of carbonizer and other lesser factors.

At elevated temperatures, part of the methane cracks to 1 molecule of carbon and 2 molecules of hydrogen. Tars present in the distillation gas also crack to carbon and hydrogen. Thus additional hydrogen becomes available when the distillation gas is heated to the cracking temperature.

In the process of our invention, high-volatile coal is added at one or preferably more points along the side of the kiln, where the temperature is high enough to start immediate distillation of the coal. Measured quantities of forced air are admitted at a multiple number of points along the side of the kiln before, between and after the coal feeders.

Only a small amount of air is injected at any one point in order to prevent complete combustion of the carbon, volatile matter, or reduction gases (i.e. CO). The air "burns" completely as a flame in the gaseous atmosphere in the center of the kiln, exactly the same as gas burning in air. Due to the specified load factor and free evolution of gas from the bed, no air remains for burning carbon on or in the ore bed in the kiln.

As the incoming coal falls onto the hot bed it begins to distill at once, at first giving off higher hydrocarbons from methane to tars. The air from the nearest air ports partially burns and/or cracks these rich hydrocarbons and provides heat for the process.

In carbonization of coal the richer or heavier hydrocarbons distill off first, and as time goes on the hydrogen content gradually increases until toward the completion of carbonization the hydrogen content in distillation gas may be 80 to 90%. It should be noted that it takes time for carbonization, the time depending on temperature. Bed temperatures and retention time are therefore controlled to provide sufficient time so that some hydrogen is always present in the bed throughout the kiln after the points where the coal is added.

Due to the mixing action of the rotating kiln, the distilling coal mixes with the ore in the bed and gives off hydrogen and methane in the bed where reduction of ore occurs. Gas samples taken from the bed at various points along the kiln length bear this out and are shown in the examples.

In addition to the method of producing highly reducing atmospheres in the bed consisting of hydrogen, methane and carbon monoxide as described from coals, lignites and other high volatile solid carbonaceous materials, we have also developed an alternative method of injecting natural gas along the kiln in such a manner that it enters beneath the bed and in ascending therethrough is cracked to carbon and hydrogen gas. Natural gas, or other gases containing a substantial percentage of methane, can be used in order to provide the reducing hydrogen gas, as well as fuel for the system as it burns above the bed.

It is common knowledge that the rate of reduction of ores increases with temperature, and that at a given temperature hydrogen reduces at a somewhat higher rate than carbon monoxide. It is also known that the higher the $CO:CO_2$ ratio or higher $H_2:H_2O$ ratio, the faster the reduction. It is the unique advantage of our invention that, by promoting the formation of hydrogen within the kiln bed, reduction proceeds at a higher rate and at a lower temperature than has heretofore been possible.

For example, with one particular mix of ore, flux, and coal ash, it was found that the melting point, or rather the point of incipient fusion, was about 1875° F. It was therefore necessary to run the kiln so that the temperature at the highest point, the discharge end, was not in excess of this figure. Under these operating conditions, the temperature gradient away from the discharge end was such that only 37 feet from the discharge end the temperature was only 1670° F. As is well known, the conventional reduction mechanisms involving carbon and carbon monoxide are comparatively slow at this temperature. However, by generating hydrogen within the bed itself, a reactant having a higher reaction rate than CO was made available and the ratio of reducing gases to $CO_2$ was increased. Both of these factors tend to give a substantially greater degree of reduction.

Turning now to the preferred apparatus within which the above-described process measures may be carried out, our invention utilizes a rotary kiln which is equipped with inlet ports or pipes extending into the interior thereof through which combustion air may be admitted, as desired, to any particular area of the kiln. One or more of the charging devices of the general type used heretofore on occasion by kiln operators are located along the length of the kiln, and another different kind of charging device, which is capable of projecting small-sized solid material into the kiln, is located at the discharge end, along with a conventional gas or oil-burner. In actual practice, an oxidizing atmosphere is established and maintained in that half of the kiln nearest the charging end by supplying air through the inlet ports to this area so that the ore, which can be mixed with fluxes and some reductant, is initially dehydrated, calcined, and desulfurized during its traversal of this portion of the kiln. Approximately midway of the length of the kiln, substantial quantities of high-volatile reductant are introduced into the charge through the continuous charging device in the wall of the kiln, and a reducing atmosphere is thereby established in the manner hereinbefore described, thus partially reducing metallic values contained in the ore. In accordance with a further feature of the invention, the continuous charging device positioned midway in the kiln body is further utilized for recycling of fines that are caught in the effluent gases issuing from the charge end of the kiln, and for initially charging fine ores that range from 50 mesh down to micron sizes. By charging such fines into the hot, reducing portion of the kiln they are quickly sintered into larger particles, eliminating any circulating load of fines, and adding to the general efficiency of the process. These return fines, or new fines, may be introduced alone or mixed with reductant, as desired. Mixing of return fines with reductant is particularly advantageous when certain high-volatile coking coals having a high degree of fluidity are used. Such coals have a tendency to form rings in the kilns, and mixing them with return fines eliminates this possibility.

The novel charging device at the discharge end of the kiln is used to add carbonaceous material at any point along the reducing zone of the kiln, both the quantity and locations of the additions being determined by the precise requirements of the furnace feed. That is to say, the material is so placed that it will be properly charred or coked by the time it is discharged from the kiln. It was found that combustion of volatile matter from material so placed was sufficient to maintain the fuel balance and insure a proper temperature of the kiln discharge, thus practically eliminating the need for the gas or oil burner. In this manner, the final discharge from the kiln contains all the necessary ingredients, including the stoichiometric quantity of carbon in the desired state, for an optimum furnace reducing burden, in intimate admixture, and at a controlled elevated temperature. As will be readily appreciated, this feature of our invention provides a means of furnishing the desired amount of carbon char in the final kiln discharge and/or electric furnace feed in the event that low-volatile fuels such as anthracite or other forms of carbon containing less than approximately 15 percent volatile content are not readily available, or are not desired for use in the smelting practice in the electric furnace. In addition, the method provides a ready means for accurately controlling the residual carbon in the kiln discharge under conditions in which the carbon char from bituminous coals or lignites, coke breeze, etc., has been totally consumed in the kiln or consumed to a degree where there is a stoichiometric deficiency for most efficient furnace operation.

In essence, therefore, an integral feature of our invention involves the method for introducing high-voltatile solid carbonaceous, or even liquid hydrocarbon materials, into the kiln in such manner as to position the material on the kiln bed for optimum conditioning at the point of discharge from the kiln. In this manner, the carbonaceous additive is injected onto the surface of the active bed, or the kiln lining, at a position varying anywhere from between approximately one to forty feet upstream or up-kiln from the point of discharge; whereby the volatile gases, hydrocarbons, and other vapors will be distilled off and aid in the reduction, as previously described. The residual carbon char or partially-coked material remains in, and becomes intimately admixed with, the kiln discharge. The expense of charring high-volatile reductants in separate equipment is thus avoided, and the entire optima desired for prime furnace feed can be achieved in the single kiln unit.

It should be emphasized that any solid carbonaceous fuel can be used in the practice of our invention including, by way of illustration, anthracite, lignite, and bituminous coals of any volatile, ash, and reasonable sulfur content and possessing coking qualities ranging from oxidized non-coking coals to high-coking coals, coke breeze, peat, sawdust, hulls, wood chips and the like. It is necessary only to know the composition of the reductant, so that proper quantities will be used and, whether impurities such as sulfur are present, so that appropriate controls may be exercised in the actual kiln operation to eliminate the same. Of course, the requirements of the hydrogen reduction mechanism dictate the use of at least some volatile materials when this preferred mechanism is utilized.

It is believed that a more comprehensive understanding of the foregoing principles and procedures of our invention may be had by referring to a specific embodiment of the same taken in conjunction with the annexed drawings, wherein:

FIG. 4 is a perspective drawing showing the preferred arrangement of the kiln structure of the invention in relation to rotary-hearth electric furnace adapted for direct charging from the kiln.

Figure 1:
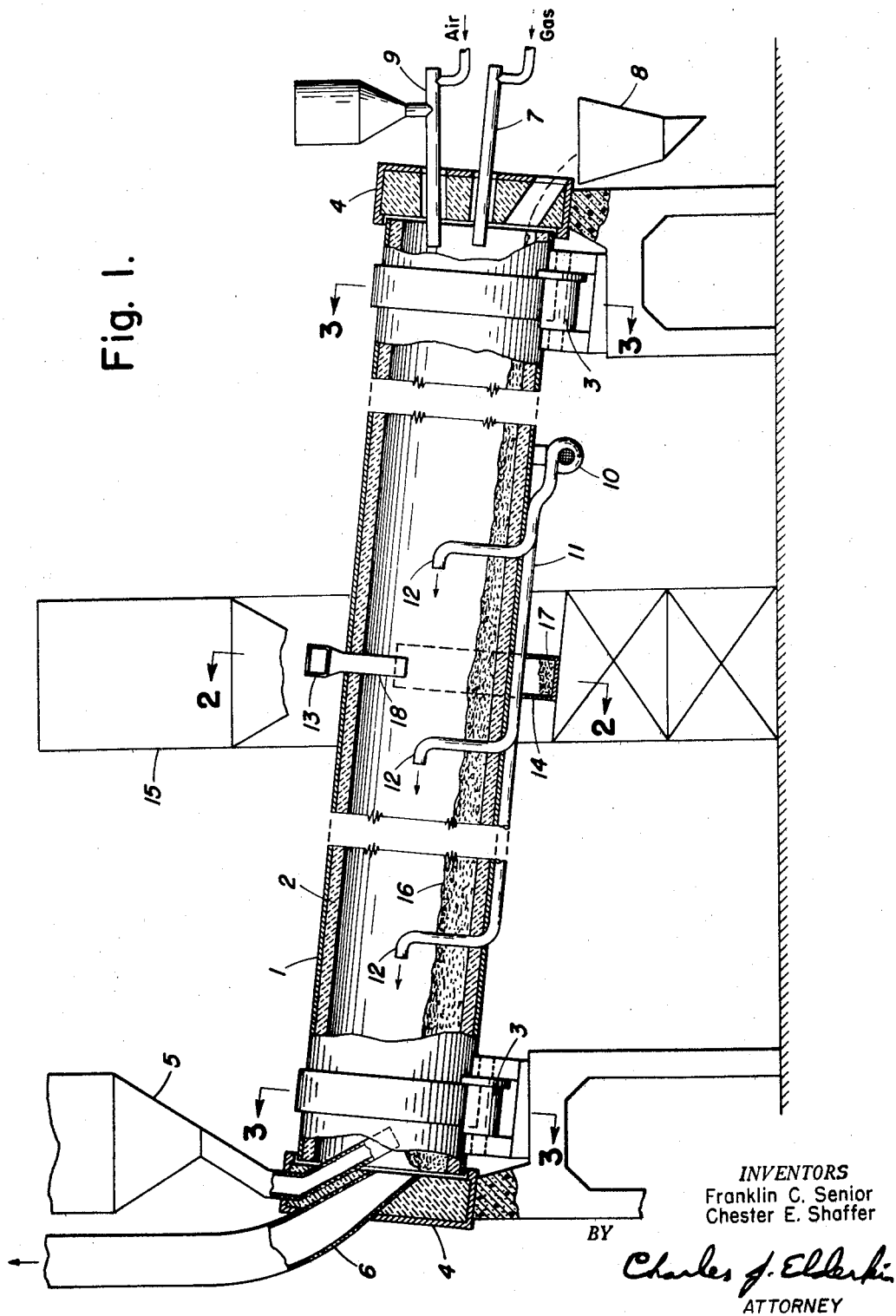
FIG. 1 is an elevational view, partially cut-away, illustrating the unique kiln structure utilized in the practice of the invention.
Figure 2:
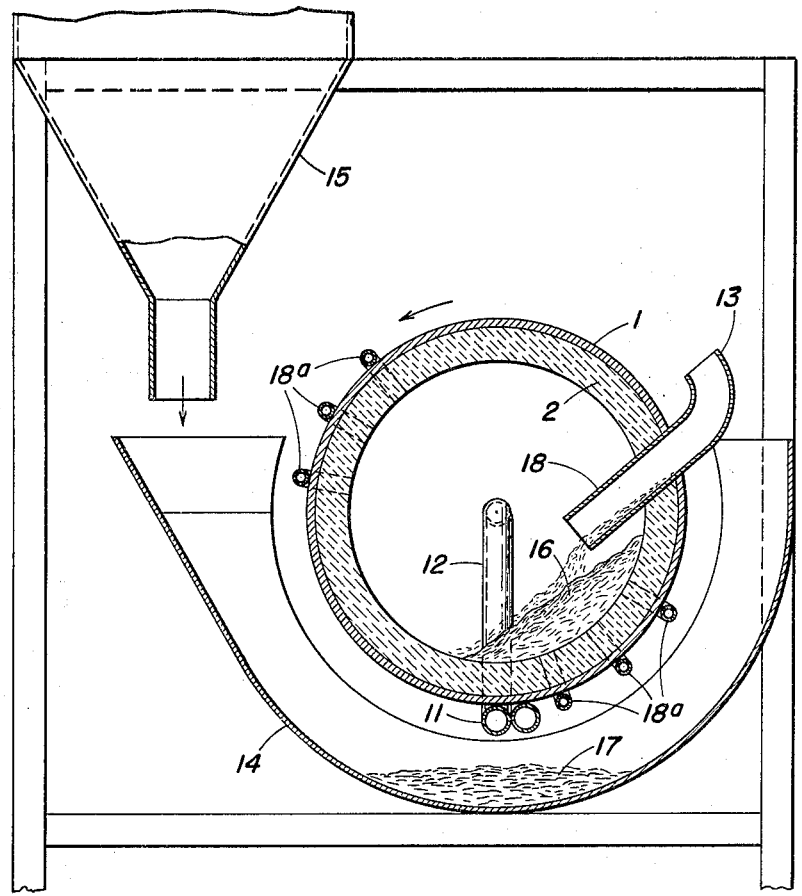
FIG. 2 is a sectional view taken along line 2—2 of FIG. 1, and further illustrating features of the kiln structure of the invention.

With reference to FIG. 1, there is shown a conventional steel-shell rotary kiln 1 equipped with a refractory lining 2 and mounted for rotation on trunnions 3. The kiln is terminated with stationary end-walls 4 containing orifices for (a) charging from the charge-bin 5, (b) a hood for the removal of effluent gases 6, (c) a gas- or oil-fired burner 7, (d) discharging into an insulated hopper 8, and (e) a special charging device for injecting solid material into the kiln interior 9. A motor-driven fan 10 is mounted on the outside of the steel shell but spaced a few inches away from the shelll to avoid overheating. The fan 10 is adapted to blow air through a plurality of stainless steel inlet pipes 11, each equipped with simple valves (not shown), and which pierce the shell of the kiln at various places along the length of the kiln, terminating in centrally located orifices facing in the direction of gas-flow inside the kiln 12. It is necessary that the orifices face in this direction so that an essentially negative pressure can be maintained within the kiln and also to minimize turbulent flow which would otherwise cause undue losses of fines. Alternatively, a plurality of fans can be used so that each inlet pipe 11 has an individual fan attached thereto. Also, for purposes of injecting reducing gas beneath the bed, pipes 18a can be mounted as shown in FIG. 2, and activated when they are beneath the bed on each rotation of the kiln. Midway down the length of the kiln, a scoop 13 is mounted for continuously charging of reductant to the reducing zone of the kiln. Operation of the scoop is shown in greater detail in FIG. 2; the scoop 13 preferably being formed of stainless steel or brick and including a pipe 18 extending at an angle into the interior of the kiln. A measured quantity of reductant 17 is fed into an open trough 14 from bin 15 so that on each revolution of the kiln the scoop picks up a predetermined quantity of reductant. As the reductant-filled scoop leaves the trough the reductant is distributed over the surface of the charge in the kiln. The pipe 18 serves to keep the hot bed 16 from discharging when the scoop is in the trough, as it is always above the top level of the kiln bed. It has been found that by inserting the pipe 18 at an angle, as shown in FIG. 2, a much better distribution of reductant occurs than when the pipe goes straight in, and dusting is substantially lowered. The number of such scoops must, of course, be determined by their size and the volume of material to be charged with each revolution (only one is shown). If a greater quantity of reductant is desired at any given time, the rotation of the kiln can be interrupted and reductant from the bin fed directly into the kiln. Alternatively, kiln rotational speed may be varied to suit any desired retention time in the kiln. For most applications and the previously described load factors, a retention time of 3 to 6 hours has been found satisfactory. Retention time is advantageously controlled by varying the speed of rotation. The scoop and trough are so designed as to allow for clearance for the stainless pipes or ducts 11.

In operation, crushed ore, or a mixture of ores, is charged into the charge bin 5, with essential fluxes and/or carbonaceous reductant mixed in as required, from where it is continuously fed by metered flow into the charging end of the kiln. Temperatures suitable for the reactions desired are maintained by addition of a suitable combination of coal through scoops 13 and forced air through pipes 11 and/or the gas- or oil-fired burner 7. Alternatively, the inlet pipes 11 may be arranged so as to inject a reducing gas into the bed 16. To establish and maintain an oxidizing atmosphere over the bed 16 in approximately the first half of the operation, valves on the pipes 12 are opened and combustion air is permitted to enter the kiln and pass over the charge bed therein. If there is a high percentage of fines in the charge, dust losses through the hood 6 will be high, but this dust can be recovered in suitable dust cleaners and/or precipitation apparatus (not shown) and is simply returned to the kiln through bin 15. By inserting return fines at the mid zone of the kiln, alone or with solid carbonaceous fuel, they sinter quickly into normal charge sizes, and are thus passed out of the system at the discharge end of the kiln rather than becoming a circulating burden. The angle at which pipe 18 enters the kiln effects a gradual introduction of fines close to the charge surface and thus helps prevent dusting. In the first or oxidizing zone or area of the kiln, sulfur is removed from both the ore and the reductant. In actual practice, it is found that as much as 90 percent of the total sulfur present in ores can be removed in this manner, together with 50 to 70 percent of the sulfur present in the reductant. Dehydration, agglomeration, and calcining of the charge also take place while the charge moves through this oxidizing zone of the kiln.

At approximately the mid-point of the kiln, reductant is introduced through the scoop 13 in the manner described heretofore, and the atmosphere above and in the bed is changed from oxidizing to reducing. The reductant distills off its volatile hydrocarbon constituents due to the high temperatures, and the gases produced, as well as direct reactions between carbon and the ore constituents, result in reducing the metallic oxides to lower oxide forms and to the elemental state, as previously described.

In the specific embodiment illustrated in the drawing, the auxiliary charging device 9 is equipped with a pressure gas line for feeding compressed air or other gases used as a propellant in injecting the carbonaceous material required to adjust the charged material to optimum composition. This unit is powerful enough to throw coal about one-half the length of the kiln, and may be so adjusted as to introduce the material at any desired point along this half of the kiln. The rate of feed, and precise trajectory are simply determined by calculating the additional reductant required in the final furnace feed, based on actual samplings, and how long a residence time is required to thoroughly coke the material thus introduced. It is understood that any suitable mechanical throwing device can also be used for this purpose. Since the operation is continuous, distances inside the kiln are proportional to retention time, provided that allowance is made for the fact that larger particles move through the kiln at a slightly faster rate than smaller particles.

Figure 3:
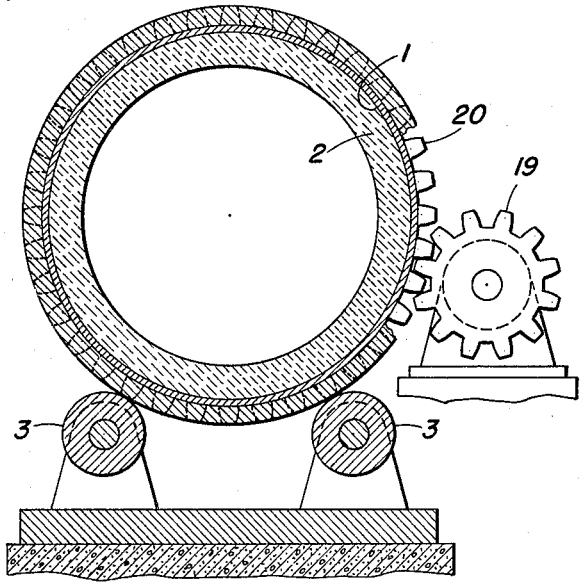
FIG. 3 is a sectional view taken along line 3—3 of FIG. 1, further illustrating features of the kiln structure of the invention.

FIG. 2 illustrates the structure of the mid-point charging device. As can be readily seen, the material being treated 16 occupies about 6 to 15% of the area within the kiln, in accordance with the previously-described load-factor conditions. As described in detail hereinbefore, scoop 13 is mounted at an angle as shown, so that when the charge material 17 is discharged into the kiln, it has only a short fall onto the bed 16. FIG. 3, a sectional view of FIG. 1 taken at line 3–3, shows the drive and mounting details of the kiln structure, including trunnions 3, drive motor 19 and gear ring 20 connected therewith.

When the free-flowing material reaches the discharge end of the kiln, it may be emptied into an insulated hopper-bucket 8 for eventual transfer to the smelting furnace. Preferred operation, however, involves having the kiln discharge feed directly and continuously into a rotating hearth electric furnace. Either a rotating or fixed hearth furnace can be provided to insure an even distribution of burden over the melt, and the capacity and smelting rate of the furnace are commensurate with the rate of production of the kiln. With a rotating-hearth furnace, truly continuous operation is achieved, it being necessary to interrupt rotation only to tap the furnace from time to time. The relative relationship of the component units for this type of operation is best illustrated in FIG. 4 of the drawings.

It is believed that a more detailed understanding of the process of our invention may be had by referring to the following specific examples illustrating both the former practice and the improvements contributed by the principles and procedures of the present invention.

EXAMPLE 1

To provide a suitable standard of comparison, a trial was made before any alterations were made to a conventional rotary kiln. The ore, a roasted magnetite iron ore concentrate of very fine size, was charged with fluxes and low volatile coal into the feed end. All combustion air entered the discharge end of the kiln, through the firing hood. Results are shown in Table I.

*Table I.—Conventional practice*

CHARGE ANALYSIS

| Ore: | Percent |
|---|---|
| Fe | 46.6 |
| Gangue | 34.0 |
| Sulfur | 0.03 |

| Coal (low volatile): | |
|---|---|
| V.M. | 19.3 |
| F.C. | 74.3 |
| Ash | 6.4 |
| Sulfur | 0.5 |

KILN OPERATING DATA

| Ore | lb/hr | 1900 |
|---|---|---|
| Flux | lb/hr | 370 |
| Low-volatile coal | lb/hr | 420 |
| Natural gas fired | s.c.f.h. | 890 |
| Sinter discharge temperature | °F | 1920 |
| Mid-point of kiln temperature | °F | 1085 |
| Flue-gas temperature | °F | 689 |
| Firing hood draft | inches water | 0.05 |
| Load factor (discharge end) | percent | 7.2 |
| Retention time | hrs | 3.0 |

FLUE GAS ANALYSIS

| | Percent |
|---|---|
| $CO_2$ | 18.1 |
| $O_2$ | 1.0 |
| CO | 1.9 |

| Sulfur in sinter | 0.11 |
|---|---|
| Reduction of ore | 38 to 40 |

In spite of a high sinter discharge temperature (1920° F.), only about 39% of the oxygen in the oxides of iron was removed in the kiln. There was considerable fusing and caking of the charge on the kiln walls up to 25 feet from the discharge end, which required frequent rodding and barring to sustain operation, and a doughnut ring formed at times. In short, the kiln operation was unsatisfactory.

After discharge from the kiln, the 1920° F. sinter was collected in an insulated container. On setting for one half to 1 hour while filling, the fine sinter particles, containing metallic iron, fused or welded together, forming a solid cake that could be removed from the containers only with extreme difficulty, by heavy pounding and barring.

The 1.9% CO in flue gas indicated that about 12% of the heat in the coal was lost as CO in flue gas, including $H_2$, and $CH_4$ was also lost. The oxygen content, from air entering at the discharge end, indicates an oxidizing condition throughout the entire length of the kiln.

EXAMPLE 2

Five 3-inch air pipes were installed along the outside of the kiln at 6-ft. intervals, beginning at about the one-third point, measured from the discharge end. The pipes were connected with ducts leading to a motor-blower mounted on the sidewall of the kiln. Air at sufficient positive static pressure was metered into the kiln at the five points, and thus created a long combustion zone by controlling the composition of the gases and temperature of the kiln in this zone, and in the entire kiln.

Also, several scoops were mounted on the side of the kiln at about the mid-point to feed high volatile coals and lignites into the kiln. The scoops, as they rotated with the kiln, picked up their charge of high-volatile coal from a stationary trough under the kiln, as described heretofore. Since no coal or other fuel was charged to the feed end, there was a combustion zone of about half the kiln length from the coal feeding point to the feed end, in which the volatiles from the coal were given time to be distilled, reacted and/or burned almost completely.

The ore used was an unroasted high sulfur magnetite iron ore concentrate of fine size from the same mine as was used in Example 1. The coal was high-volatile type, and contained a high sulfur content as seen in Table II.

*Table II.—Modified operation*

CHARGE ANALYSIS

| Ore: | Percent |
|---|---|
| Fe | 53.0 |
| Gangue | 24.5 |
| Sulfur | 0.82 |
| Coal, high-volatile: | |
| V.M. | 32.8 |
| F.C. | 58.0 |
| Ash | 8.2 |
| Sulfur | 2.9 |

KILN OPERATING DATA

| | | |
|---|---|---|
| Ore | lb./hr | 1900 |
| High-volatile coal | lb./hr | 380 |
| Natural gas fired | s.c.f.h. | 445 |
| Sinter discharge temperature | ° F | 1780 |
| Mid-point of kiln temperature | ° F | 1660 |
| Flue-gas temperature | ° F | 890 |
| Firing hood draft | in. water | 0.02 |
| Load factor (discharge end) | percent | 6.7 |
| Retention time | hrs | 3.0 |

FLUE-GAS ANALYSIS

| | Percent |
|---|---|
| $CO_2$ | 18.6 |
| $O_2$ | 0.9 |
| CO | 0.4 |
| Sulfur in sinter | 1.01 |
| Reduction of ore | 51 |
| Sulfur removal | 22 |

In this run, using controlled side-air and side-coal feeding, the sinter discharge temperature of 1780° F. was 140° lower than in Example 1, in which the orthodox method of feeding and firing was used. Due to hydrogen reduction at the lower temperature, no caking or fusion of sinter to the kiln walls occurred. Also, in spite of the higher degree of reduction (giving a higher percentage of metallic iron in the sinter) no caking of sinter or welding of iron particles occurred in the sinter receiving containers, and it flowed freely when discharged through the bottom hopper.

Although the discharge temperature was low enough to give trouble-free operation, the mid-point temperature was increased from 1085° (Example 1) to 1660° F. Thus, the reducing zone in the kiln was effectively lengthened and due to hydrocarbon distillation the retention time under reducing conditions was correspondingly increased. This explains the higher percentage reduction of ore (51% as against 39%), even at the lower discharge temperature.

Through side-air control, it was possible to maintain a reducing atmosphere in the discharge half of the kiln, and yet add sufficient air in the feed half to burn the excess amounts of volatile matter and tar from the high-volatile coal. At 0.4% CO in flue gas, only about 2% of the total heat in coal was lost as combustibles in flue gas.

At the end of the run there was no build-up of dust in any part of the dust collector, fan or other gas handling system, indicating that the tars had been practically completely utilized.

No special attempt was made to burn out sulfur from the coal and ore in this run. However, 22% of the sulfur from the coal and ore was burned out in kiln, even with the higher prereduction.

Through controlled combustion by side-air distribution, and through almost complete utilization of the large amount of tar and volatile matter, a high degree of pre-reduction was obtained, a substantial percentage of the sulfur was burned, and the discharge temperature was lowered sufficiently to give a free-flowing sinter.

The practically complete combustion of the large quantity of tar and volatiles provided so much heat that the natural gas fired was only half of that used in Example 1, where low-volatile coal was used. In this example only about 8% of the total heat released in the kiln came from natural gas. The remainder came from the high-volatile coal. Yet only 10% of the fixed carbon in the coal was burned.

EXAMPLE 3

During this run the same ore and coal was used as in Example 2. Substantially more air was injected into the feed half of the kiln in order to burn out sulfur from the ore and coal. Results are shown in Table III.

*Table III.—Combined oxidizing-reducing operation*

KILN OPERATING DATA

| | | |
|---|---|---|
| Ore | lb./hr | 2000 |
| High-volatile coal | lb./hr | 400 |
| Natural gas fired | s.c.f.h. | 420 |
| Sinter discharge temperature | ° F | 1795 |
| Mid-point of kiln temperature | ° F | 1640 |
| Flue-gas temperature | ° F | 1030 |
| Firing hood draft | inches water | 0.02 |
| Load factor (discharge end) | percent | 7.0 |
| Retention time | hrs | 3.25 |

FLUE-GAS ANALYSIS

| | Percent |
|---|---|
| $CO_2$ | 17.4 |
| $O_2$ | 2.0 |
| CO | 0.2 |
| Sulfur in sinter | 0.40 |
| Reduction of ore | 43 |
| Sulfur removal | 72 |

As seen in the above flue-gas analysis, excess air was injected into the feed half of the kiln to give 2.0% excess oxygen and negligible CO. The excess of $O_2$ was over and above the oxygen required to burn sulfur. The gases contained 0.5% $SO_2$.

During the run, 72% of the total sulfur in the coal and ore was burned to $SO_2$ and eliminated from the sinter. It is anticipated that this figure can be raised to 85% or higher, provided the sulfur is in a burnable form, (pyrite, organic sulfur in coal, etc.).

Again, as in Example 2, a low discharge temperature (1795° F.) was maintained, while obtaining a 1640° F. mid-point temperature. This was accomplished as before by burning excess volatile matter of the side-fed coal in a long, but not excessively hot, combustion zone, controlled by the use of forced side air at a plurality of points.

The use of a higher oxidizing atmosphere in the feed end half lowered the percent reduction from 51 to 43%. The use of a longer kiln with longer retention time will obviate this condition.

The heat loss in combustibles in flue-gas was less than 0.5% in this run. Yet the gas used for firing the kiln did not increase over that of Example 2.

No troubles were experienced with caking, sticking, or ringing of charge in the kiln.

EXAMPLE 4

In this test a limonitic iron ore was used, with a high-ash lignite as reductant. Results are shown in Table IV.

Table IV.—Operation with lignite

CHARGE ANALYSIS

Ore: Percent
- Fe ............................................. 39.2
- Gangue ........................................ 30.1
- Loss on ignition .............................. 13.3
- Sulfur ........................................ 0.3

Lignite:
- V.M. .......................................... 42.9
- F.C. .......................................... 31.1
- Ash ........................................... 26.0
- Sulfur ........................................ 0.9

KILN OPERATING DATA

- Ore ..................................... lb./hr.. 1625
- Lignite ................................. lb./hr.. 560
- Natural gas fired ....................... s.c.f.h.. 460
- Sinter discharge temperature ............ °F.. 1850
- Mid-point of kiln temperature ........... °F.. 1542
- Flue-gas temperature .................... °F.. 935
- Firing hood draft ............... inches water.. 0.02
- Load factor (discharge end) ........... percent.. 6.0
- Retention time ........................... hrs.. 3.10

FLUE-GAS ANALYSIS

Percent
- $CO_2$ .......................................... 21.5
- $O_2$ ........................................... 0.5
- CO ............................................. 0.5
- Sulfur in sinter ............................... 0.40
- Reduction of ore ............................... 68
- Sulfur removal ................................. 45

The much higher percent reduction of the iron ore (68%) in this run resulted in part from the porous texture of the ore, but mainly from the substantial quantities of hydrogen and methane released in the bed and the high reactivity of the lignite char after distillation of volatile matter in the kiln. Yet the excessively large quantity of volatile matter was almost completely utilized, as shown by the low CO content in flue gas. After the run there was no accumulation of tarry dust in the dust collector or elsewhere.

About 45% of the total sulfur in ore and coal was burned out in the kiln.

As before there was no caking or ringing of sinter in the kiln.

EXAMPLE 5

When prereducing an ore in a kiln for subsequent smelting in a smelter, it is desirable to supply carbon in stoichiometric amount to complete the reduction in the smelter. For example, a sinter prepared from a hematitic ore, and prereduced 55% in the kiln, still required considerable carbon addition in the smelter to complete the reduction. If there is 50% iron in the sinter at 55% prereduction it will require 7.25 lb. of carbon per hundred lb. of carbon-free sinter charged to the furnace in order to complete the reduction to metal.

With properly controlled side-air entering the kiln at several points, only 5 to 10% of the fixed carbon in the reductant is burned, even when using high-volatile coals or lignite, due to hydrogen and methane reduction. When using coke or coke breeze of 85 to 95% fixed carbon or olw-volatile coal of 75 to 82% fixed carbon content, there is little difficulty in obtaining a large excess of carbon in the sinter. However, as previously shown, there is insufficient volatiles in these fuels to heat the kiln and assist in the reduction, and a large amount of gas or other fuel must be fired into the discharge end of the kiln. Moreover, if the fuel is charged into the feed end, or side scoops, and should the smelting furnace require more or less carbon, due to lesser or greater prereduction being desired in the kiln, a change in the carbon content of the sinter will require several hours due to the long retention time of ore and carbon in the kiln.

When charging high-volatile coal or lignite to the kiln, the amount that can be charged is limited by the heat generated in burning the excess volatile matter. If more carbon is needed for the smelter, it is sometimes not possible to charge more of these fuels to the feed end or side scoops of the kiln, or the kiln may be overheated in burning the extra volatiles.

To secure immediate control of carbon in the sinter, and to obtain more carbon in the sinter when using high-volatile coals or lignites, the kiln was operated in a manner in which high-volatile coal was injected into the discharge end of the kiln onto the hot sinter bed and/or the hot kiln walls at a point ranging from zero to 30 ft. from the discharge end. Sufficient coal or other fuel can be used, so that the heat generated by the burnng of the volatile matter from the fuel not consumed in reduction approximates the heat of combustion of the replaced natural gas fuel.

With sinter discharging at about 1750 lb. per hour, and natural gas being fired at 450 s.c.f.h. (460,000 B.t.u. per hour), the gas was turned off, and the injected high volatile coal was fired at 110 lb. per hour. The coal was all minus ¼ in. in size, and contained 3.3% minus 100 mesh, most of which apparently burned in suspension in the mouth of the kiln. The coarser material fell onto the sinter bed or the wall of the kiln, which was discharging at 1900° F. at the start of the test. This coal was devolatilized almost instantly and the volatiles burned with inspirated air in a large yellow flame filling the entire cross-section of the kiln. As previously described, insufficient air was inspirated for complete combustion of the volatiles so that hydrogen would remain in the bed. Combustion of excess volatiles was completed with side air further up the kiln, as described in former examples.

The char or coke residue from the devolatilized injected coil remained in a layer on the bed to prevent reoxidation of the core. It was discharged with the sinter to provide excess carbon to complete the stoichiometric carbon requirement of the electric smelter. Thus, a complete furnace burden was prepared in the kiln from high volatile coal (36% volatile matter).

Before the coal was injected, the carbon content of the sinter was 2.7% by weight, or about 39% of the total carbon required to complete reduction of a 50% Fe sinter at 55% prereduction. After the coal injection was begun, carbon content of the sinter from the kiln was increased in a matter of minutes, to 8%, or slightly more than the stoichiometric quantity required for completion of the reduction to metal in the electric furnace. By synchronous adjustment of both the side coal feed and the injected coal feed it was possible to (1) maintain the desired percent carbon in the sinter and still heat the kiln to the desired temperature, and (2) maintain the desired combustion and atmospheric controls required for sulfur removal, prereduction and the like, and (3) maintain a free-flowing sinter.

In another test, with different ore and coal larger than described above, it was found that 11% carbon char was being discharged with the sinter; therefore, a finer sized coal was used in order to obtain the desired relationship of percent carbon in sinter, and the heat-release in the kiln. The coal was all minus ⅛ inch and contained 16% minus 100 mesh. In this case, the extreme fines burned in suspension to give a hot luminous flame to heat the kiln, while the coarser particles fell to the hot bed and were devolatilized to char, which was discharged with the sinter. In this last period the carbon content of sinter dropped from 11% to about 7.5% when the finer coal was substituted for the coarser.

Thus, it was found that by controlling the degree of pulverization of the coal, carbon in the kiln discharge could be effectively controlled.

At the same time that the high-volatile coals were being injected into the discharge end of the kiln, the kiln continued operation with the mid-point scoops feeding the high-volatile coal mixed with return fines from the dust catcher.

High-volatile coking coals, when melted, are often quite fluid. These coals generally melt in a temperature range of 600° to 750° F., or far below normal kiln temperatures. In accordance with the preferred practice of our invention, when coal of this type is mixed with the ore fines and/or flue dust, the coal particles are dispersed and no operating difficulties arise. On the other hand, when the high-volatile coal is charged alone, i.e., without a mixture of ore fines or flue dust or other inerts, the particles melt and run together to form a sticky molten mass, which sometimes adheres to the kiln sidewalls. The mass may then be distilled to form solid coke, which grows in extent as more coal is charged. Finally, a thick coke ring may be built up around the entire kiln sidewall at the charge ports. The flow of ore through the kiln may thus be partially stopped. Also, the ore bed will be starved for carbon reductant during the period of ring build-up and reduction will stop. Finally, the ring will break and fall of its own weight, and an undesirable excess of carbon will be discharged with the reduced ore (or sinter). These difficulties are readily avoided, however, even when the coal is not mixed with flue dust or ore fines, through the maintenance of sufficiently high mid-point temperatures. Distillation and cracking of the volatile content then takes place before any such sticky molten mass has a chance to form.

EXAMPLE 6

Two tests were run in order to determine with exactness the distribution of reducing gases within the bed. In these tests, a substantially larger kiln (150 feet) was utilized, and the degree of reduction was held constant at 35% in the first and 40% in the second test. The pertinent operating data, along with temperature measurements and gas analyses, will be found in Table V.

Table V

MATERIAL FLOW

| | |
|---|---|
| Iron ore (57.2% Fe), lb./hr | 10,000 |
| Bituminous coal, lb./hr | 2,850 |
| Anthracite coal, lb./hr | 600 |
| Lime, lb./hr | 1,700 |
| Natural gas fuel, s.c.f.h | 2,650 |
| Load factor (discharge end), percent | 8.6 |
| Retention time, hrs | 3.2 |

TEMPERATURES

| | Feet from discharge end | Temp. of bed, ° F. |
|---|---|---|
| Discharge end | 5 | 1,850 |
| No. 3 couple | 37 | 1,670 |
| No. 2 couple | 67 | 1,650 |
| No. 1 couple | 107 | 1,380 |
| Feed end | 145 | 950 |

GAS ANALYSES FROM BED

| Sample pipe No. | Feet from discharge end | Percent $CO_2$ | Percent CO | Percent $H_2$ | Percent $CH_4$ | Percent $N_2$ |
|---|---|---|---|---|---|---|
| 1 | 30 | 31.9 | 56.9 | 8.8 | 0.3 | 2.1 |
| 2 | 45 | 13.3 | 16.7 | 44.6 | 11.8 | 13.4 |
| No. 1 coal feed | 52 | | | | | |
| 3 | 60 | 48.5 | 25.7 | 13.5 | 0.9 | 11.0 |
| 4 | 75 | 9.9 | 5.3 | 42.0 | 19.5 | 24.4 |
| No. 2 coal feed | 83 | | | | | |

It will be seen that at sample points 2 and 4 (7 to 8 feet downstream from the coal feeders) the methane in the bed gas was quite high (11.8% and 19.5% respectively). At points 1 and 3 (22 and 23 feet downstream from the coal feeders) there was very little methane, but the carbonizing coal was still giving off hydrogen, as shown by the analyses. There was thus an appreciable amount of hydrogen in the bed from No. 2 coal feeder to No. 1 sample point, a distance of some 50 feet. Also, there was no doubt some hydrogen in the bed in the last 30 feet from the sample point to the discharge end.

In the second test, reduction was held at 40%, but the throughput of ore and coal were increased, while the natural gas feed was correspondingly cut down. Results are shown in Table VI.

Table VI

MATERIAL FLOW

| | |
|---|---|
| Ore (57.2% Fe), lb./hr | 12,000 |
| Bituminous coal, lb./hr | 3,100 |
| Coke breeze, lb./hr | 320 |
| Lime, lb./hr | 1,750 |
| Natural gas fuel, s.c.f.h | 1,800 |
| Load factor (discharge end), percent | 10.5 |
| Retention time, hours | 4.0 |

TEMPERATURES

| | Feet from discharge end | Temp. of bed, ° F. |
|---|---|---|
| Discharge end | 5 | 1,840 |
| No. 3 couple | 37 | 1,600 |
| No. 2 couple | 67 | 1,590 |
| No. 1 couple | 107 | 1,290 |
| Feed end | 145 | 1,190 |

GAS ANALYSES FROM BED

| Sample pipe No. | Feet from discharge end | Percent $CO_2$ | Percent CO | Percent $H_2$ | Percent $CH_4$ | Percent $N_2$ |
|---|---|---|---|---|---|---|
| 1 | 30 | 24.7 | 57.7 | 15.1 | 1.0 | 1.5 |
| 2 | 45 | 6.0 | 7.3 | 36.3 | 13.5 | 36.7 |
| No. 1 coal feed | 52 | | | | | |
| 3 | 60 | 45.4 | 33.6 | 11.9 | 0.8 | 8.3 |
| 4 | 75 | 12.7 | 11.1 | 41.1 | 17.7 | 17.3 |
| No. 2 coal feed | 83 | | | | | |

It will be noted that under these conditions there was almost twice the amount of hydrogen in the bed 30 feet from the discharge end as there was in the previous test, and that this increase in hydrogen was entirely at the expense of the amount of $CO_2$ present. At a temperature of approximately 1700° C., it can be seen that both the added hydrogen and the decreased $CO_2$ will have a substantial effect on reducing conditions.

It is to be emphasized that due to the large number of cooperating factors subjected to positive control in the present invention, the examples have been chosen as illustrative of specific facets of the entire invention, which comprehends the complete preparation of an electric furnace burden in a rotating kiln.

Having thus described the subject matter of our invention, what it is desired to secure by Letters Patent is:

1. Process for the continuous pretreatment of a metallurgical charge in a rotary kiln, that comprises, charging sufficient ore, flux, and carbonaceous reductant to said rotary kiln so as to occupy no more than 15 percent of the cross-sectional area of said kiln, at least partially oxidizing said charge at an elevated temperature within said kiln to effect dehydration thereof and the removal of volatile and oxidizable components therefrom including sulfur and arsenic, adding additional reductant to the oxidized charge and reducing said charge within said kiln to effect sintering, agglomeration and partial metallization thereof, and injecting additional quantities of carbonaceous reductant into said partially reduced charge to establish the total residual carbon content of the charge as discharged from said kiln at about the approximate stoichiometric quantity required for effecting total metallization of the metallic content thereof upon subsequent smelting of said kiln discharge.

2. The process as claimed in claim 1, wherein said additional reductant added to said oxidized charge is a carbonaceous reductant containing volatile hydrocarbons, and the partial metallization of said charge is effected by contact and reaction with solid carbon, gaseous carbon monoxide, hydrogen and said volatile hydrocarbons contained in said carbonaceous reductant.

3. The process as claimed in claim 1, wherein said charge occupies between approximately six and eleven percent (6–11%) of the cross-sectional area of said kiln.

4. The process as claimed in claim 1, wherein the retention time of said charge in said kiln is within the range of approximately three to six hours (3 to 6 hrs.).

5. The process as claimed in claim 1 wherein said additional reductant added to said oxidized charge is a hydrogen-containing gas.

6. The process as claimed in claim 1, wherein fine ores are added to said charge with said additional reductant following oxidation of the charge to effect sintering and intimate admixture of said fine ores into the over-all kiln discharge.

7. The process as claimed in claim 1, wherein the carbonaceous reductant injected into said partially reduced charge contains volatile hydrocarbon components, and said injection is effected at a point in the kiln whereby said volatile components are substantially completely distilled off from the reductant prior to discharge of the over-all charge from the kiln.

8. Process for the continuous treatment of a metallurgical charge that comprises charging sufficient ore, flux and carbonaceous reductant into a rotary kiln, so as to occupy no more than 15 percent of the cross-sectional area of said kiln, at least partially oxidizing said charge at an elevated temperature within said kiln to effect dehydration thereof and the removal of volatile and oxidizable components therefrom including sulfur and arsenic, adding additional reductant to the oxidized charge and reducing said charge within said kiln to effect sintering, agglomeration and partial metallization thereof, injecting additional carbonaceous reductant into said partially reduced charge to establish the total residual carbon content of the charge as discharged from said kiln at about the approximate stoichiometric quantity required for effecting the degree of metallization desired upon subsequent smelting of said kiln discharge, supplying said kiln discharge while hot to an electric smelting furnace, and smelting the same therein to effect total reduction to the metallic state of the desired metallic component thereof.

9. The process as claimed in claim 8, wherein said additional reductant added to said oxidized charge is a carbonaceous reductant containing volatile hydrocarbons, and the partial metallization of said charge is effected by contact and reaction with said carbon, gaseous carbon monoxide, hydrogen, and said volatile hydrocarbons contained in said carbonaceous reductant.

10. The process as claimed in claim 8, wherein the retention time of said charge in said kiln is within the range of approximately three to six hours (3 to 6 hrs.).

11. The process as claimed in claim 8, wherein the carbonaceous reductant injected into said partially reduced charge contains volatile components, said injection being effected at a point in the kiln sufficient to insure thorough coking of said reductant through distillation of said volatile components prior to discharge of the charge from the kiln.

12. In a unit rotary kiln, the improvement that comprises charging means located along the length of said kiln, said means comprising a pipe having one end exterior of said kiln and extending through the shell and into the interior thereof, a scoop on said exterior end, said scoop having its open side turned so as to pick up charge material held below said kiln and deposit same within said kiln upon rotation thereof, and said pipe being inserted through said shell at an angle so as to have the interior end thereof just above the surface of material being treated in said kiln at the time of discharge of said charge material from said pipe when said charge material occupies about 15 percent of the cross-sectional area of said kiln.

References Cited by the Examiner

UNITED STATES PATENTS

| | | | |
|---|---|---|---|
| 1,050,255 | 1/13 | Tommasini | 75—11 X |
| 1,372,392 | 3/21 | Basset | 75—38 X |
| 1,421,182 | 6/22 | Driscoll | 75—11 X |
| 1,829,438 | 10/31 | Coley | 75—36 X |
| 1,920,379 | 8/33 | Greene | 75—11 X |
| 2,484,911 | 10/49 | Seil. | |
| 2,593,398 | 4/52 | Kalling | 75—36 |
| 2,754,197 | 7/56 | Wienert | 75—36 |
| 2,941,791 | 6/60 | Wienert | 75—34 |
| 3,029,141 | 4/62 | Sibakin | 75—34 |
| 3,034,884 | 5/62 | Meyer | 75—34 |
| 3,046,106 | 7/62 | Hemminger | 75—36 |

FOREIGN PATENTS 22,236 10/11 Great Britain.

DAVID L. RECK, *Primary Examiner.*